United States Patent [19]
Clark

[11] Patent Number: 6,134,336
[45] Date of Patent: Oct. 17, 2000

[54] INTEGRATED SPEAKER ASSEMBLY OF A PORTABLE ELECTRONIC DEVICE

[75] Inventor: Joel Anthony Clark, Woodridge, Ill.

[73] Assignee: Motorola, Inc., Schaumburg, Ill.

[21] Appl. No.: 09/079,013

[22] Filed: May 14, 1998

[51] Int. Cl.[7] .................................................. H04R 25/00
[52] U.S. Cl. .......................................... 381/371; 381/386
[58] Field of Search ..................................... 381/344, 345, 381/386, 370, 371, 396; 379/431, 432, 433; 455/90, 575

[56] References Cited

U.S. PATENT DOCUMENTS

| | | | |
|---|---|---|---|
| 3,798,393 | 3/1974 | Gorike | 381/371 |
| 4,005,278 | 1/1977 | Gorike | 381/371 |
| 4,239,945 | 12/1980 | Atoji | 381/371 |
| 4,429,194 | 1/1984 | Kamon et al. | 381/371 |
| 4,504,703 | 3/1985 | Schneiter et al. | 381/163 |
| 4,742,887 | 5/1988 | Yamagishi | 381/371 |
| 5,263,093 | 11/1993 | Nakamura et al. | 381/166 |
| 5,327,507 | 7/1994 | Suzuki . | |
| 5,369,701 | 11/1994 | McAteer et al. . | |
| 5,420,935 | 5/1995 | Shinohara et al. | 381/371 |
| 5,442,713 | 8/1995 | Patel et al. . | |
| 5,517,574 | 5/1996 | Tichy . | |
| 5,790,679 | 8/1998 | Hawker et al. | 381/163 |
| 5,844,998 | 12/1998 | Nageno | 381/371 |
| 5,949,897 | 9/1999 | Bartels | 381/371 |

*Primary Examiner*—Huyen Le
*Assistant Examiner*—P. Dabney
*Attorney, Agent, or Firm*—John J. Oskorep; Brian M. Mancini

[57] ABSTRACT

An integrated speaker assembly (400) of a portable electronic device, such as a portable radiotelephone (100), is described. A housing portion (116) has a first surface adapted to form at least part of a front surface (112) or a rear surface (113) of the portable radiotelephone (100). A speaker diaphragm (402) is attached to a second surface opposite the first surface.

13 Claims, 10 Drawing Sheets

— PRIOR ART —

INTEGRATED SPEAKER ASSEMBLY OF A PORTABLE ELECTRONIC DEVICE

FIELD OF THE INVENTION

The present invention relates generally to the field of speaker assemblies of portable electronic devices.

BACKGROUND OF THE INVENTION

A handheld portable electronic device, such as a portable radiotelephone, employs a speaker to convert electrical signals into sound waves in the human-audible frequency range of 20 Hertz (Hz) to 20,000 kiloHz (kHz). The speaker enables a user of the radiotelephone to hear a representation of a caller's voice, as well as other sounds such as dial tones. The quality of the sound reproduction is an important factor in a customer's decision to buy a portable radiotelephone. Audio quality of a speaker is determined by its frequency response over the audible frequency range. Manufacturers of speakers normally provide a specified frequency response of a speaker when it is used in a "free-field" environment. Speakers employed in radiotelephones, however, are rarely used in a free-field environment. Instead, the user places the radiotelephone against his ear to hear the sound, and the speaker is positioned very close to the human ear.

The goal of an acoustic engineer in the radiotelephone field is to choose the combination of speaker, enclosure, and preconditioning electrical circuitry that provides an acceptable audio quality. An acceptable audio quality is usually a measure of how flat, or variable, the frequency response of the speaker is in its environment over the frequency range of 300 Hz to 4 kHz. The flatter, or less variation, of the frequency response, the better the audio quality. A frequency response that is higher, or boosted, in the low frequencies than in the high frequencies will sound bassy and muffled; whereas a frequency response that is higher in the high frequencies than in the low frequencies will sound shrill and tinny.

Two types of speaker technology are in predominate use for handheld radiotelephones—piezo-electric speakers and dynamic speakers—both of which have a high free air resonant frequency. Both speaker technologies are specified to work with an airtight seal between the speaker and the human ear. Achieving the airtight seal requires that the speaker have an airtight mount to the handheld radiotelephone housing and the radiotelephone housing have an airtight coupling where the housing meets the ear. The ear-housing coupling is achieved by forming a depression in the housing that conforms to the shape of the human ear. As long as the airtight seal is maintained, these types of speakers have been able to provide an acceptable frequency response.

As handheld radiotelephones become smaller in size, an airtight ear-housing coupling is difficult to achieve for all users because the housing is not large enough to form a depression in the housing surface that accommodates the size of all human ears. Consequently, for some users, an air leakage occurs between the housing and the human ear, resulting in a loss, of low frequency response. Some tests on piezoelectric-type speakers have shown that this loss can average 15 decibels (dB) at 300 Hz, resulting in a tinny sound.

Figure 9:
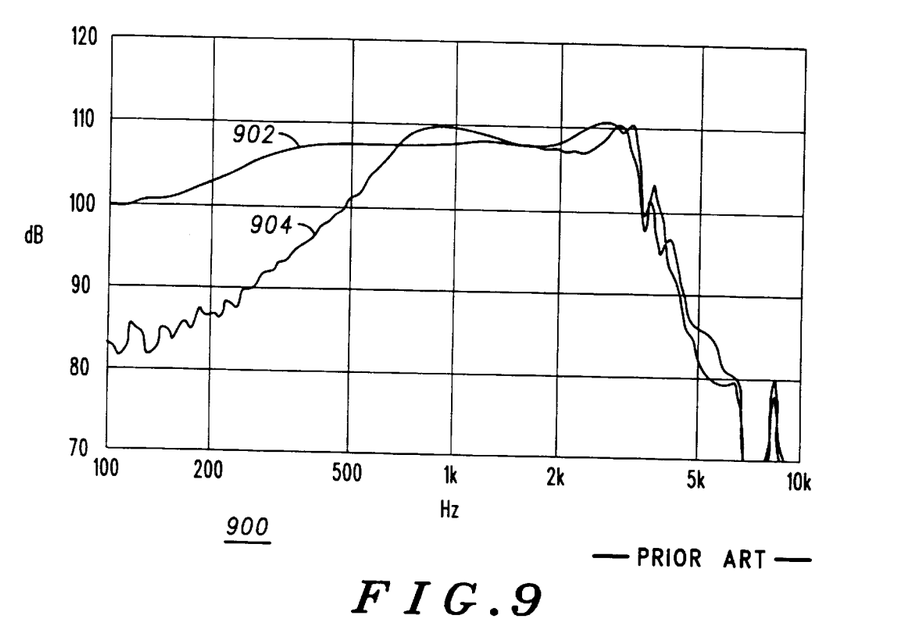
FIG. 9 is a graph showing acoustic frequency responses of a conventional portable radiotelephone in sealed and unsealed conditions, using a piezo-electric speaker with a high free air fundamental resonant frequency.

To illustrate further, FIG. 9 shows a graph 900 of acoustic frequency response curves 902 and 904 from a conventional portable radiotelephone using a piezo-electric type speaker with a high free air fundamental resonant frequency. Each of acoustic frequency response curves 902 and 904 show an acoustic sound pressure level versus frequency. More specifically, acoustic frequency response curve 902 was obtained where an earcup of the conventional portable radiotelephone was sealed to an artificial ear (IEC-318 type, not shown). Acoustic frequency response curve 904 was obtained where the earcup was unsealed using a leakage ring adapter (not shown) in conjunction with the artificial ear. As acoustic frequency response curve 904 reveals, an undesirable bass loss is present in the unsealed condition.

A low-acoustic impedance dynamic speaker (having a lower free air resonant frequency than the piezo-speaker mentioned above) is designed to boost the frequency response at the low end of the frequency range, and can be used to remedy the bass loss caused by air leakage between the housing and the human ear. Such a speaker—when mounted with an airtight seal between the speaker and the housing—however, exhibits excessive low frequency gain when an airtight seal is formed between the housing and the human ear. Consequently, the sound is bassy and muffled. Furthermore, there is a large variation of about 11 dB between the highest and lowest point in the frequency response, thus the audio quality is poor.

Figure 10:
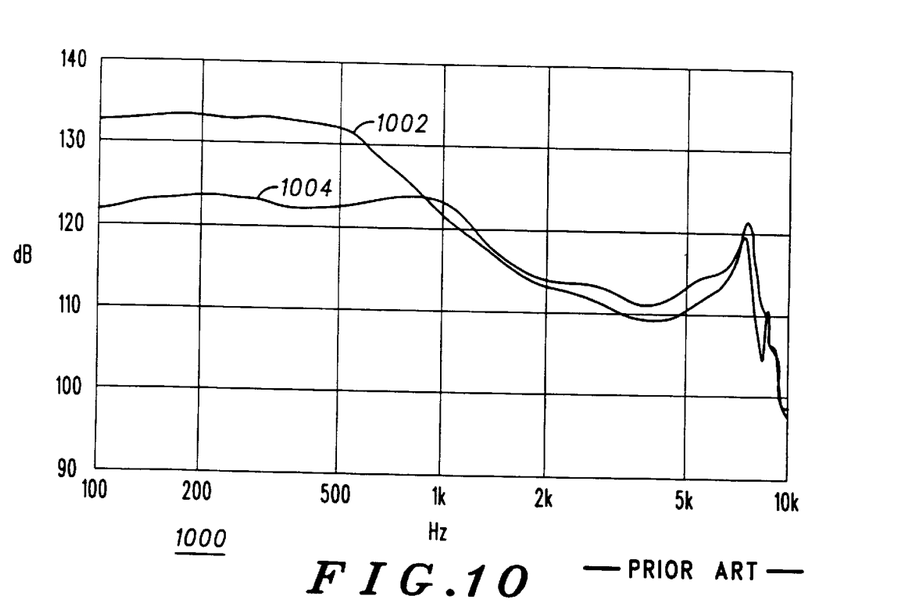
FIG. 10 is a graph showing acoustic frequency responses of another conventional portable radiotelephone in sealed and unsealed conditions, using a low acoustic impedance dynamic type speaker having a low free air fundamental resonant frequency.

To illustrate further, FIG. 10 shows a graph 1000 of acoustic frequency response curves 1002 and 1004 from a conventional portable radiotelephone, using a low acoustic impedance dynamic type speaker having a low free air fundamental resonant frequency. Each of acoustic frequency response curves 1002 and 1004 show an acoustic sound pressure level versus frequency. More specifically, acoustic frequency response curve 1002 was obtained where an earcup of the conventional portable radiotelephone was sealed to the artificial ear. Acoustic frequency response curve 1004 was obtained where the earcup was unsealed using the leakage ring adapter in conjunction with the artificial ear. As acoustic frequency response curve 1002 reveals, an undesirable bass boost is present in the sealed condition.

The size of the smaller handheld radiotelephones not only affects the seal between the housing and the human ear but also the size of the enclosure housing the speaker. Smaller handheld radiotelephones have less space to house the enclosure, and the size of the enclosure affects the frequency response of the speaker.

Figure 3:
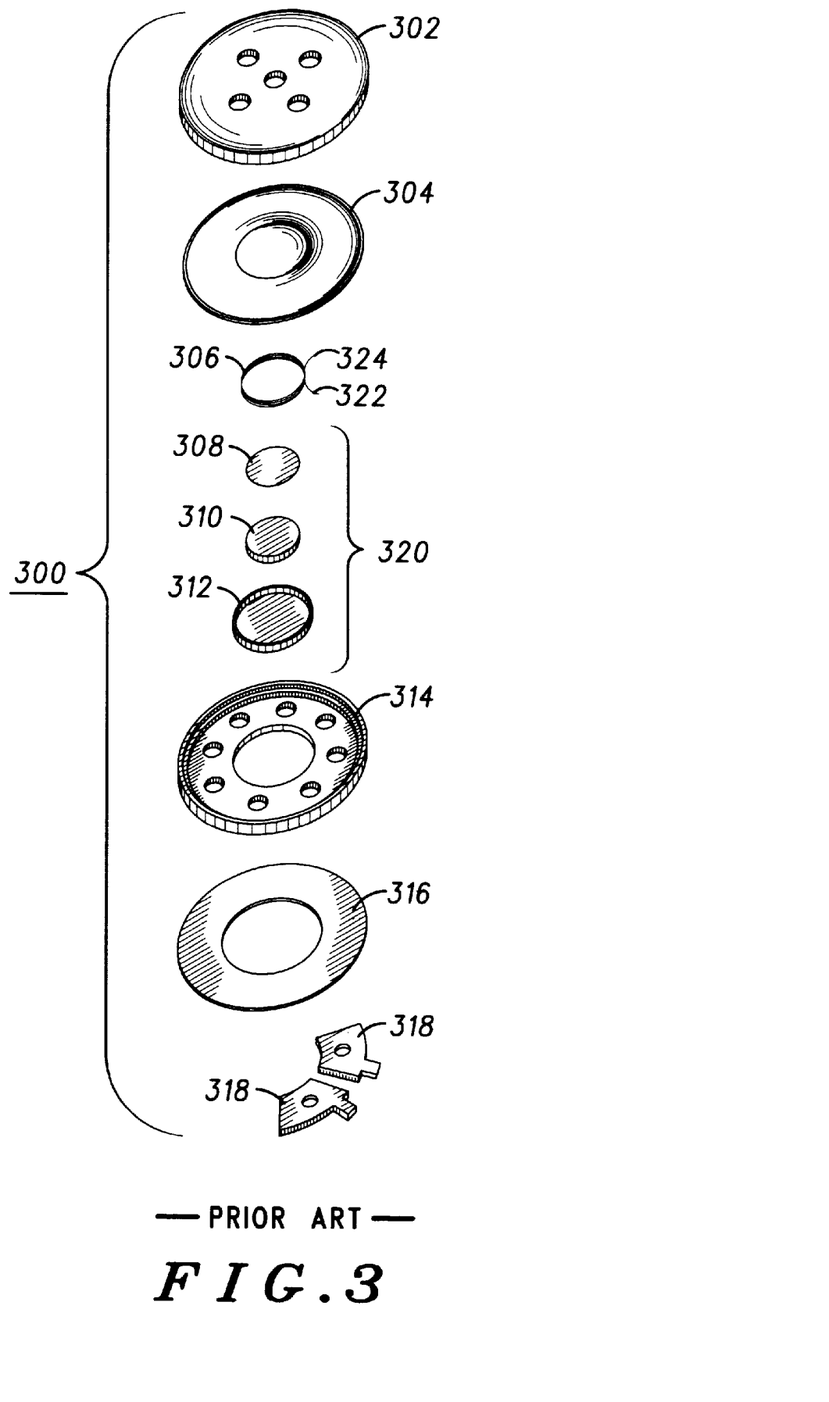
FIG. 3 is an exploded view of a conventional speaker assembly.

Referring now to FIG. 3, an exploded view of a conventional speaker assembly 300 is shown. Conventional speaker assembly 300 includes a diaphragm cover 302 having a plurality of openings, a diaphragm 304, a voice coil 306, a polepiece 308, a magnet 310, a yoke 312, a basket 314 having a plurality of openings, a felt 316, and terminal lugs 318. Typically, magnet 310 is adhesively attached within yoke 312 and polepiece 308 is adhesively attached on a top of magnet 310, forming a magnetic motor assembly 320. Magnet motor assembly 320 is attached on one side of basket 314, and felt 316 is attached on the other side of basket 314 to cover at least some of the plurality of openings. Voice coil 306 is adhesively attached to one side of diaphragm 304. Diaphragm 304 has an outer edge adhesively attached around an outer edge of basket 314, thereby covering magnetic motor assembly 320 where voice coil 306 is disposed in a gap formed by magnetic motor assembly 320. Magnetic motor assembly 320 is formed to concentrate magnetic flux within the gap where a magnetic field created by electrical current through voice coil 306 moves diaphragm 304 and creates acoustic sound pressure waves.

In a conventional portable electronic device, conventional speaker assembly 300 is assembled and disposed in a housing where basket 314 and diaphragm cover 302 are disposed between inside surfaces of the housing. Diaphragm cover 302 is positioned such that the openings of diaphragm cover 302 are positioned adjacent to openings through one of the inside surfaces. A considerable amount of structural volume within the portable electronic device is consumed with such an assembly, which inhibits a reduction in the thickness of the housing.

A need therefore exists for a speaker assembly for small handheld radiotelephones, which has limited space for enclosing the speaker and limited size for providing an airtight seal with the human ear, that provides acceptable audio-quality.

DETAILED DESCRIPTION OF THE PREFERRED EMBODIMENTS

An integrated speaker assembly of a portable electronic device is disclosed. A housing portion has a first surface adapted to form at least part of an outside surface of the portable electronic device. The first surface may be adapted to form, for example, a front or a rear surface of the portable electronic device. A speaker diaphragm is attached to a second surface opposite the first surface.

Figure 1:
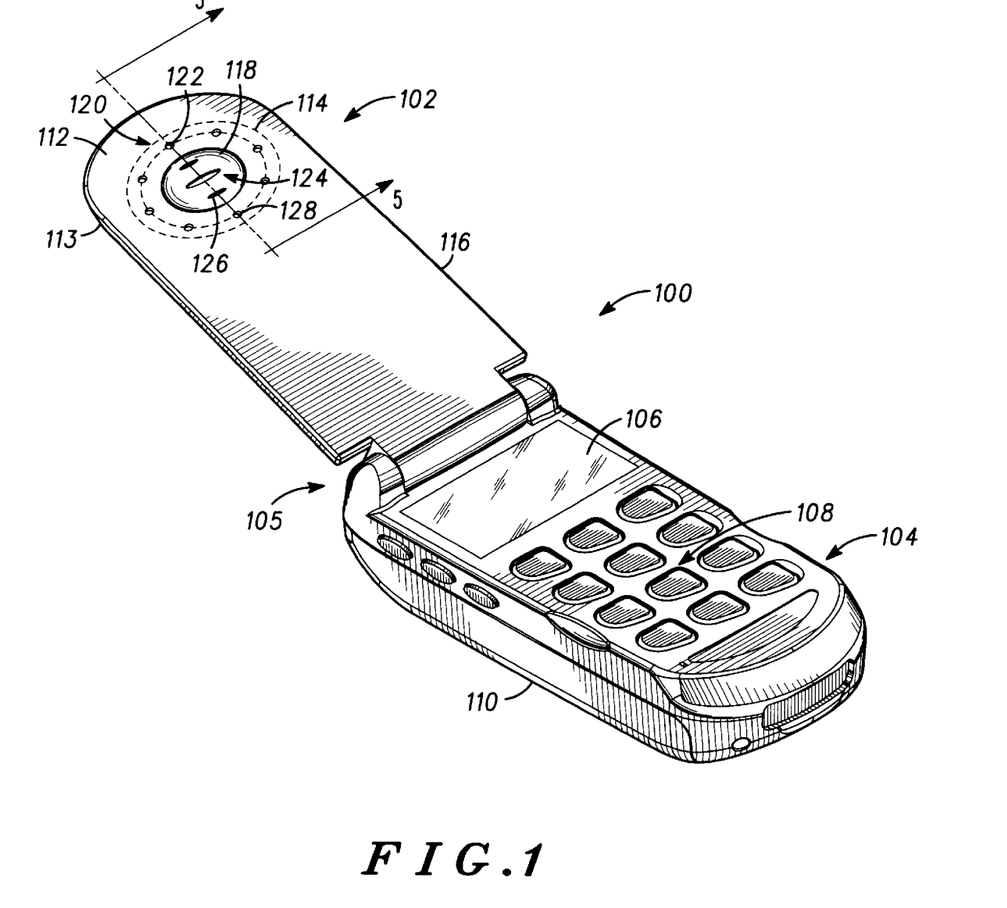
FIG. 1 is a front perspective view of a portable radiotelephone.
Figure 2:
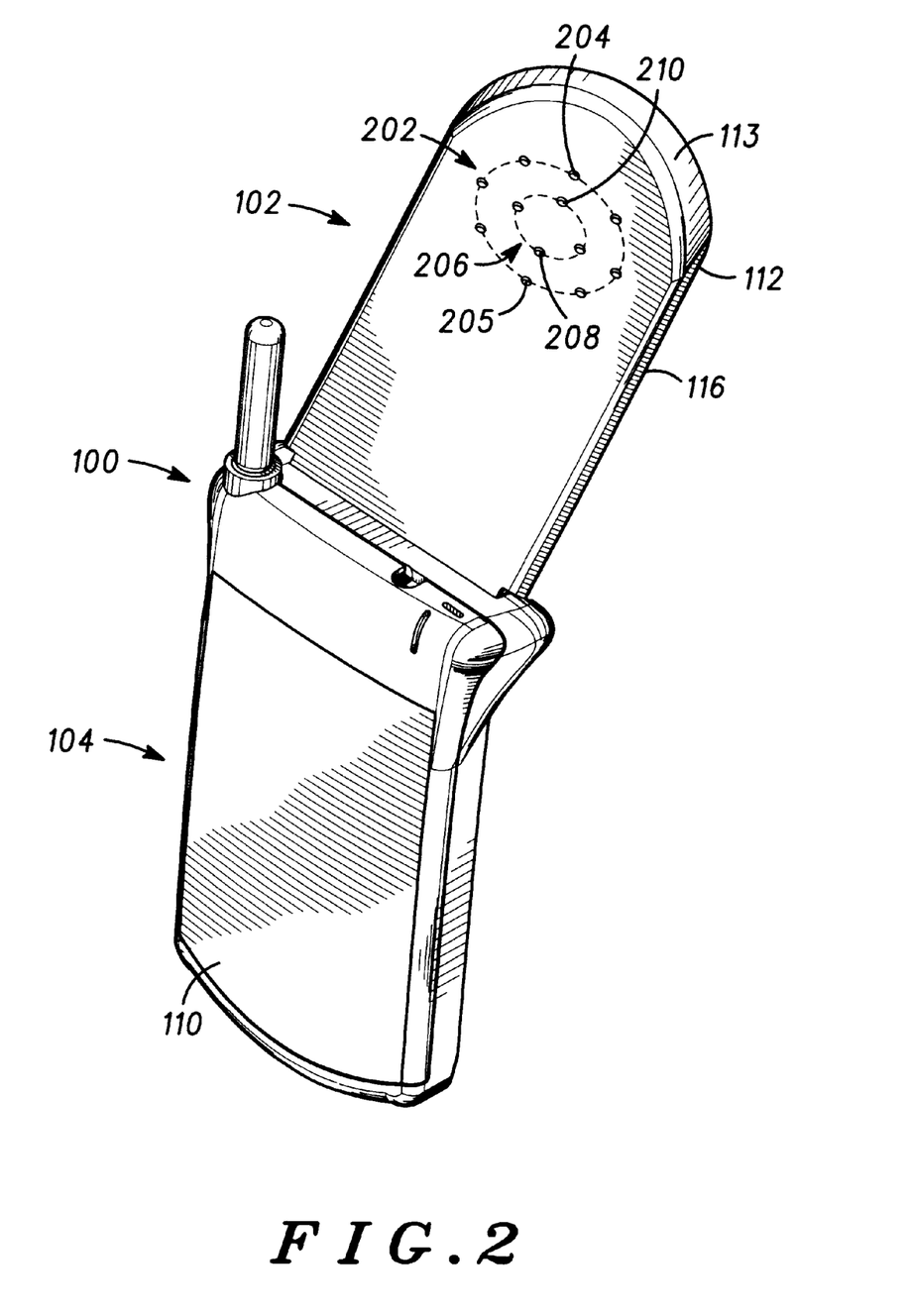
FIG. 2 is a rear perspective view of the portable radiotelephone of FIG. 1.

FIGS. 1 and 2 show front and rear perspective views, respectively, of a portable radiotelephone 100. Portable radiotelephone 100 is a portable electronic device and, more particularly, a portable electronic device that provides for wireless communication via radio frequency (RF) signals. Portable radiotelephone 100 is operable in cellular telephone systems and is commonly referred to as a portable cellular telephone.

Portable radiotelephone 100 has an upper housing 102 and a lower housing 104 rotatably connected via a hinge 105, forming a handheld housing for portable radiotelephone 100. With such a configuration, portable radiotelephone 100 is commonly referred to as a foldable or clamshell-style telephone. As shown in FIG. 1, a visual display 106 and a plurality of keys 108 are provided on a surface of lower housing 104. Electrical circuitry (not shown), which includes a radio receiver and a radio transmitter (both coupled to an antenna), and audio circuitry, is disposed in lower housing 104 and is supplied electrical energy from a detachable battery 110. Portable radiotelephone 100 is sized for handheld usage and may be referred to as a handheld portable radiotelephone.

Upper housing 102 is formed at least in part by a housing portion 116 and a housing portion 118. A front surface 112 of upper housing 102 has an ear placement region 114 (as defined here in dashed lines of FIG. 1), where an ear of a user is positioned for listening to audible voice signals. Ear placement region 114 is generally a circular or oval region on front surface 112. Ear placement region 114 is sized to accommodate an ear for listening to audio signals. Preferably, ear placement region 114 forms a (slight) recess or an earcup. Most preferably, ear placement region 114 has a maximum diameter of 25.4 mm.

A plurality of openings 124, such as an opening 126, is formed on housing portion 118 and generally centrally positioned within ear placement region 114. A plurality of openings 120 (see additional dashed lines of FIG. 1), such as an opening 122 and an opening 128, is formed on housing portion 116 and positioned within ear placement region 114 generally circularly positioned outside of and around the plurality of openings 124.

Referring to FIG. 2, a rear surface 113 of upper housing 102 reveals a plurality of openings 206 (see dashed lines of FIG. 2), such as an opening 208 and an opening 210. A plurality of openings 202 (see additional dashed lines of FIG. 2), such as an opening 204 and an opening 205, are also formed on rear surface 113. The plurality of openings 202 are generally circularly positioned outside of and around the plurality of openings 206. Being located on rear surface 113 in the embodiment shown, the plurality of openings 202 and the plurality of openings 206 are positioned outside of ear placement region 114 (FIG. 1). As will be described later in reference to FIG. 5, passages in upper housing 102 connect the plurality of openings 120 (FIG. 1) to the plurality of openings 202 (FIG. 2).

Front and rear surfaces 112 and 113 may be referred to outside or exterior surfaces of portable radiotelephone 100, in contrast to any existing inside or interior surfaces of portable radiotelephone 100.

Figure 4:
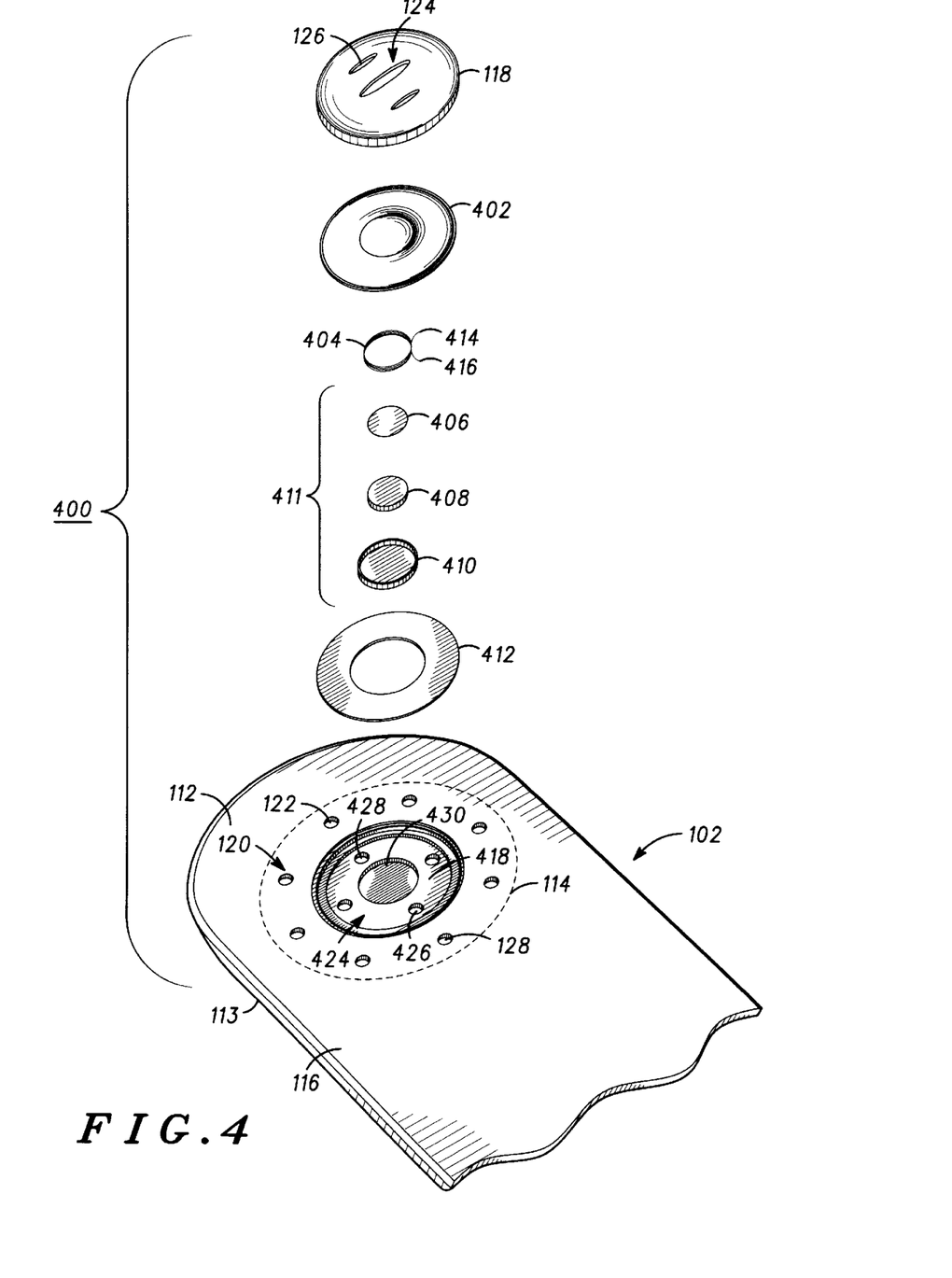
FIG. 4 is an exploded view of a first embodiment of an integrated speaker assembly of the portable radiotelephone of FIGS. 1 and 2.

FIG. 4 shows an exploded view of a first embodiment of an integrated speaker assembly 400 of portable radiotelephone 100. In the embodiment shown, integrated speaker assembly 400 includes housing portions 116 and 118, a diaphragm 402, a voice coil 404 having terminals 414 and 416, a polepiece 406, a magnet 408, a yoke 410, and a felt 412. In this embodiment, diaphragm 402 is made of a formed plastic film, such as a polyetherimide (PEI) film, a polyethylene terephthalate (PET) film, or a polyphenylene sulfide (PPS) film.

Housing portion 116 forms a recess 418 positioned within ear placement region 114 and a recess 430 positioned within recess 418. A plurality of openings 424, such as an opening 426 and an opening 428, are positioned within recess 418. As will be described later in reference to FIG. 5, passages in housing portion 116 connect each of the plurality of openings 424 to a respective one of the plurality of openings 206 (FIG. 2).

Integrated speaker assembly 400 may be assembled as follows. Felt 412 is adhesively attached within recess 418 so that it covers at least some, if not all, of the plurality of openings 424. A magnetic motor assembly 411 is formed where magnet 408 is adhesively attached within yoke 410 and polepiece 406 is adhesively attached to a top of magnet 408. Magnetic motor assembly 411 is disposed in recess 430 with a snug fit, and may be adhesively attached therein. Voice coil 404 is attached on one side of speaker diaphragm 402. (Depending how diaphragm 402 is formed, voice coil 404 may be attached to either side.)

An outer edge of diaphragm 402 is adhesively attached to (e.g., glued or attached with a gasket) and supported on front surface 112 within recess 418, covering the plurality of openings 424. Voice coil 404 is disposed within a gap formed by magnetic motor assembly 411. Terminals 414 and 416 of voice coil 404 are coupled to electrical conductors (not shown), such as wires, in housing portion 116. The electrical conductors are coupled to audio circuitry (not shown) disposed in housing 104.

The electrical conductors may be routed in housing 102 using suitable methods. For example, the electrical conductors may be insert-molded within housing portion 116. Alternatively, the electrical conductors may be included in a flexible printed circuit board (not shown), which may be routed through a channel (not shown) formed in housing portion 116. A label or escutcheon (not shown) could be used to cover the channel or, alternatively, housing portion 118 may be formed to extend to cover the channel upon attachment. Terminals 414 and 416 may be soldered to the electrical conductors, for example, or coupled using an elastomeric connector.

Housing portion 118, which is optional to provide protection of diaphragm 402, is disposed within recess 418, preferably with a snug fit, so that a top surface of housing portion 118 is at least somewhat flush with front surface 112 (e.g., as shown in FIG. 1). Housing portion 118 may be attached to housing portion 116 using adhesive, ultrasonic welding, or other suitable methods. Constructed and assembled as described, integrated speaker assembly 400 may be referred to as a "front-loaded" assembly.

Figure 5:
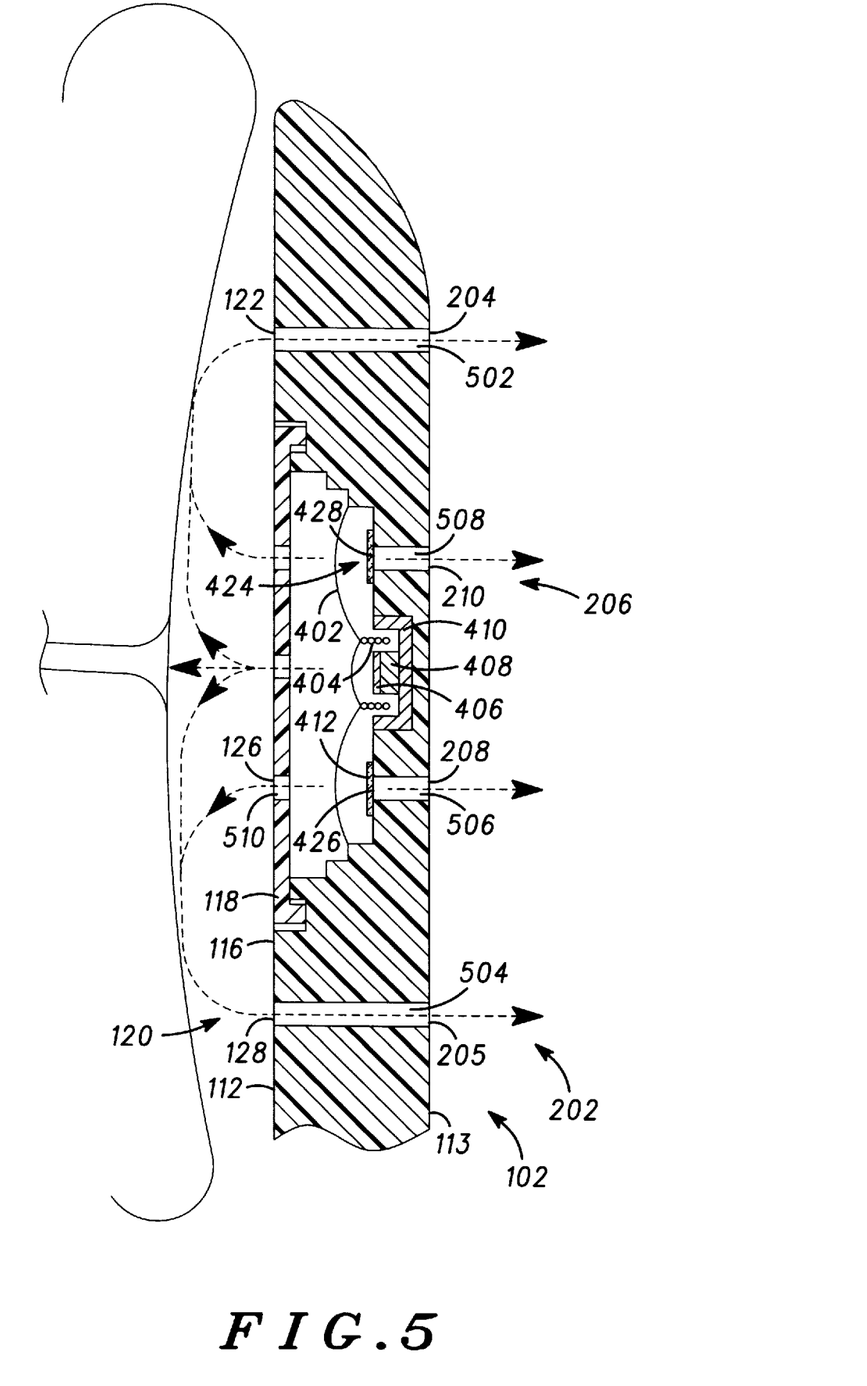
FIG. 5 is a cross section of the portable radiotelephone of FIGS. 1 and 2, taken along a line 5–5' of FIG. 1.

FIG. 5 shows a cross-section of upper housing 102 taken along lines 5–5' of FIG. 1. FIG. 5 shows the passages of upper housing 102 that connect the plurality of openings 120 to the plurality of openings 202. In this embodiment, the passages may be referred to as ports. For example, a passage 502 connects opening 122 to opening 204, and a passage 504 connects opening 128 to opening 205. Sound pressure waves travel through these passages from front surface 112 to rear surface 113 to open air.

Also shown are the passages of upper housing 102 that connect the plurality of openings 424 to the plurality of openings 206. For example, a passage 506 connects opening 426 to opening 208, and a passage 508 connects opening 428 to opening 210. The passages that include passages 506 and 508 lead from the plurality of openings 206 to a rear side of speaker diaphragm 402, so that sound pressure waves from the rear side of speaker diaphragm 402 may travel to the open air. The plurality of openings 124 (such as opening 126) has passages (such as passage 510) to a front side of speaker diaphragm 402, which allows sound pressure waves to travel from the front side of speaker diaphragm 402 to an air space in front of ear placement region 114.

Although the location of both the plurality of openings 202 and the plurality of openings 206 as shown are preferred (FIG. 2), such openings may be appropriate on any surface or region of portable radiotelephone 100 outside of ear placement region 114, such as a front surface, left and/or right side surfaces, etc.

Preferable operation of portable radiotelephone 100 is described. Signals from the audio circuitry drive voice coil 404 to move diaphragm 402, resulting in sound pressure waves being generated from front and rear sides of diaphragm 402. Sound pressure waves from the front side of diaphragm 402 travel through the passages in housing portion 118, such as passage 510. Some of the sound pressure waves exit through the plurality of openings 124 (such as opening 126) to an ear of a user of portable radiotelephone 100. In a sealed or partially sealed condition, some of the sound pressure waves travel through the plurality of openings 120 (such as openings 122 and 128) and through the passages formed in housing portion 116. These sound pressure waves escape to open air through the plurality of openings 202 (such as openings 204 and 205).

Sound pressure waves from the rear side of diaphragm 402 travel through the plurality of openings 424 (such as openings 426 and 428), through felt 412, and through the passages formed in housing portion 116. These sound pressure waves exit upper housing 102 through the plurality of openings 202 (such as openings 204 and 205) to the open air. With such an arrangement, portable radiotelephone 100 provides an acoustic frequency response that is substantially independent of a seal around ear placement region 114.

Figure 11:
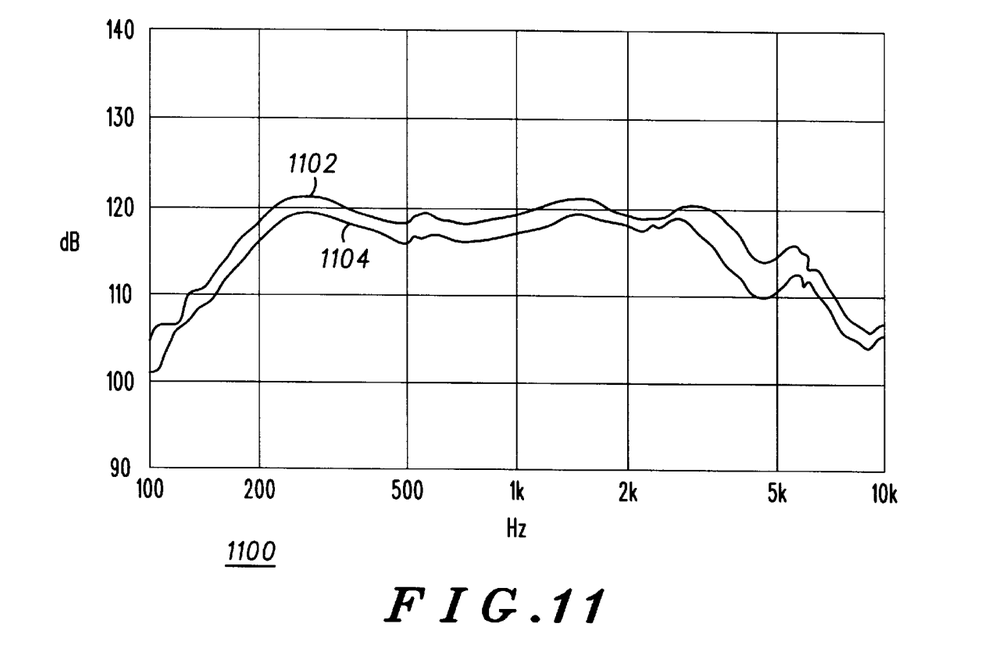
FIG. 11 is a graph showing acoustic frequency responses of the portable radiotelephone of FIGS. 1–2 and 4–6 (or the portable radiotelephone of FIGS. 7 and 8) in sealed and unsealed conditions.

To illustrate, FIG. 11 shows a graph 1100 of acoustic frequency response curves 1102 and 1104 of portable radiotelephone 100. (Similar or the same curves are applicable to describe the alternate embodiments shown and described below.) Acoustic frequency response curve 1102 was obtained where ear placement region 114 was sealed to the artificial ear, and acoustic frequency response curve 1104 was obtained where ear placement region 114 was unsealed using the leakage ring adapter. As acoustic frequency response curves 1102 and 1104 reveal, no substantial bass loss or boost occurs in the sealed condition using portable radiotelephone 100. Portable radiotelephone 100 provides an acoustic frequency response that is substantially independent of a seal around ear placement region 114.

Figure 12:
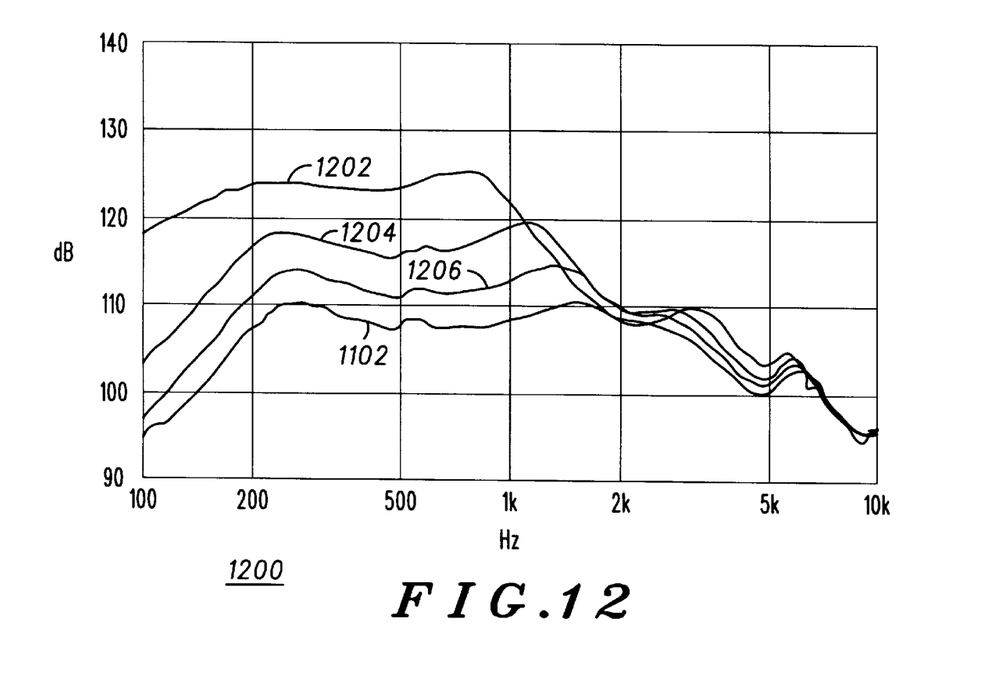
FIG. 12 is a graph showing acoustic frequency responses of the portable radiotelephone of FIGS. 1–2 and 4–6 (or the portable radiotelephone of FIGS. 7 and 8) in sealed conditions.

FIG. 12 shows a graph 1200 of acoustic frequency response curves 1102, 1202, 1204, and 1206 of portable radiotelephone 100. (Similar or the same curves are applicable to describe the alternate embodiments shown and described below.) In general, graph 1200 shows the acoustic effects the plurality of openings 120 has in the portable radiotelephone. Each of acoustic frequency response curves 1202, 1204, and 1206 was obtained where ear placement region 114 was sealed to the artificial ear, but also where at least some of the plurality of openings 120 were intentionally blocked so that sound pressure waves would not as freely pass through upper housing 102.

Acoustic frequency response curve 1102 of FIG. 12 (also shown in graph 1100 of FIG. 11) was generated where none of the eight plurality of openings 120 (see FIGS. 1 and 2) were blocked. Acoustic frequency response curve 1206 was generated where three of the eight plurality of openings 120 were blocked. Acoustic frequency response curve 1204 was generated where six of the eight plurality of openings 120 were blocked. Acoustic frequency response curve 1202 was generated where all of the eight plurality of openings 120 were blocked.

As shown by comparing each of the acoustic frequency response curves 1102, 1202, 1204, and 1206 in FIG. 12, the pluralities of openings 120 and 202 and their respective passages provide for tuning the low frequency response of portable radiotelephone 100, and make the low frequency performance of portable radiotelephone 100 substantially independent of a seal between ear placement region 114 and an ear. The pluralities of openings 120 and 202 and their respective passages are used to acoustically couple the air space formed by an ear and upper housing 102 to open air.

The size and the number of openings (i.e., the plurality of openings 120) were chosen to achieve the desired frequency response (here, acoustic frequency response curve 1102). It is understood that the size and the number of these openings may be chosen in combination with felts, screens, meshes, or other suitable materials that acoustically resist air flow to achieve a desired frequency response. In addition, the size and the number of the plurality of openings 124 may be chosen, with or without combining such materials that acoustically resist air flow, to achieve a desired response. For example, a suitable material may be disposed between housing portions 116 and 118, and attached to the inside surface of housing portion 118. Such materials may also be chosen in combination with the sizes and numbers of the pluralities of openings 206 and 424 and their respective passages connecting them for the purpose of optimizing the suspension compliance of speaker diaphragm 402. Such a combination will also optimize the low frequency performance of speaker diaphragm 402. In any of the above described arrangements, such materials may be suitably disposed in any passages and/or disposed on inside or outside housing surfaces to resist air flow through the openings.

Referring back to FIG. 4, integrated speaker assembly 400 may be assembled in other suitable fashions, such as follows. Felt 412 is adhesively attached within recess 418 so that it covers at least some, if not all, of the plurality of openings 424. Magnetic motor assembly 411 is formed where magnet 408 is adhesively attached within yoke 410 and polepiece 406 is adhesively attached to the top of magnet 408. Magnetic motor assembly is disposed in recess 430 with a snug fit, and may be adhesively attached therein. Voice coil 404 is attached to the side of speaker diaphragm 402. (Depending how speaker diaphragm 402 is formed, voice coil 404 may be attached to either side.)

Figure 6:
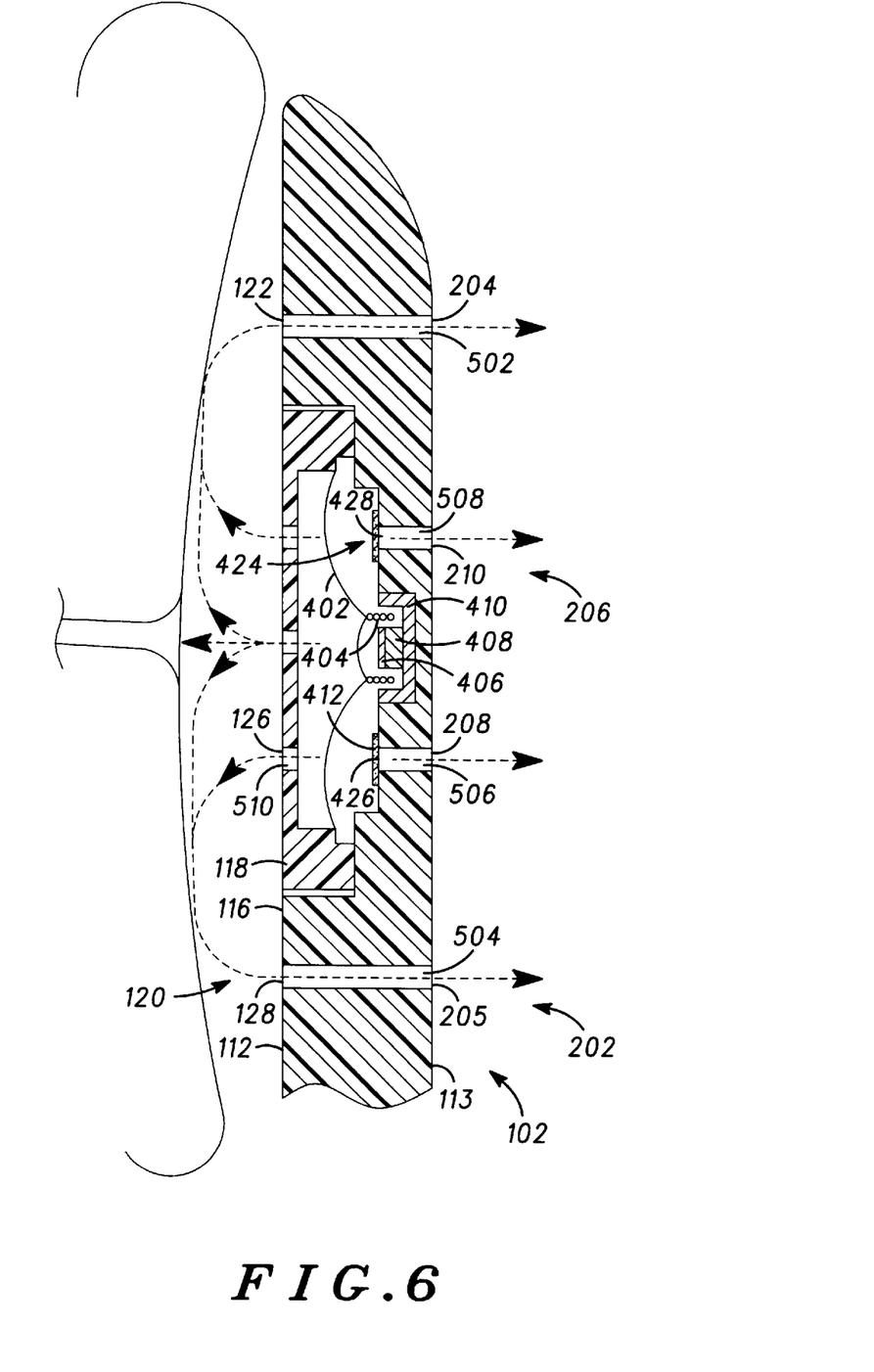
FIG. 6 is a cross section of the portable radiotelephone of FIGS. 1 and 2 in a second embodiment, taken along the line 5–5' of FIG. 1.

The outer edge of diaphragm 402 is adhesively attached to (e.g., glued or attached with a gasket) and supported by an inside surface of housing portion 118. Housing portion 118 is disposed within recess 418 and attached to housing portion 116, preferably with a snug fit, so that voice coil 404 is disposed within a gap formed by magnetic motor assembly 411 and the top surface of housing portion 118 is at least somewhat flush with front surface 112 (e.g., as shown in FIG. 1). FIG. 6 shows a cross section of the portable radiotelephone in this second alternate embodiment. The alternate assembly may operate the same as that described in relation to FIG. 5, and have the same performance as that described in relation to FIGS. 11–12.

Figure 7:
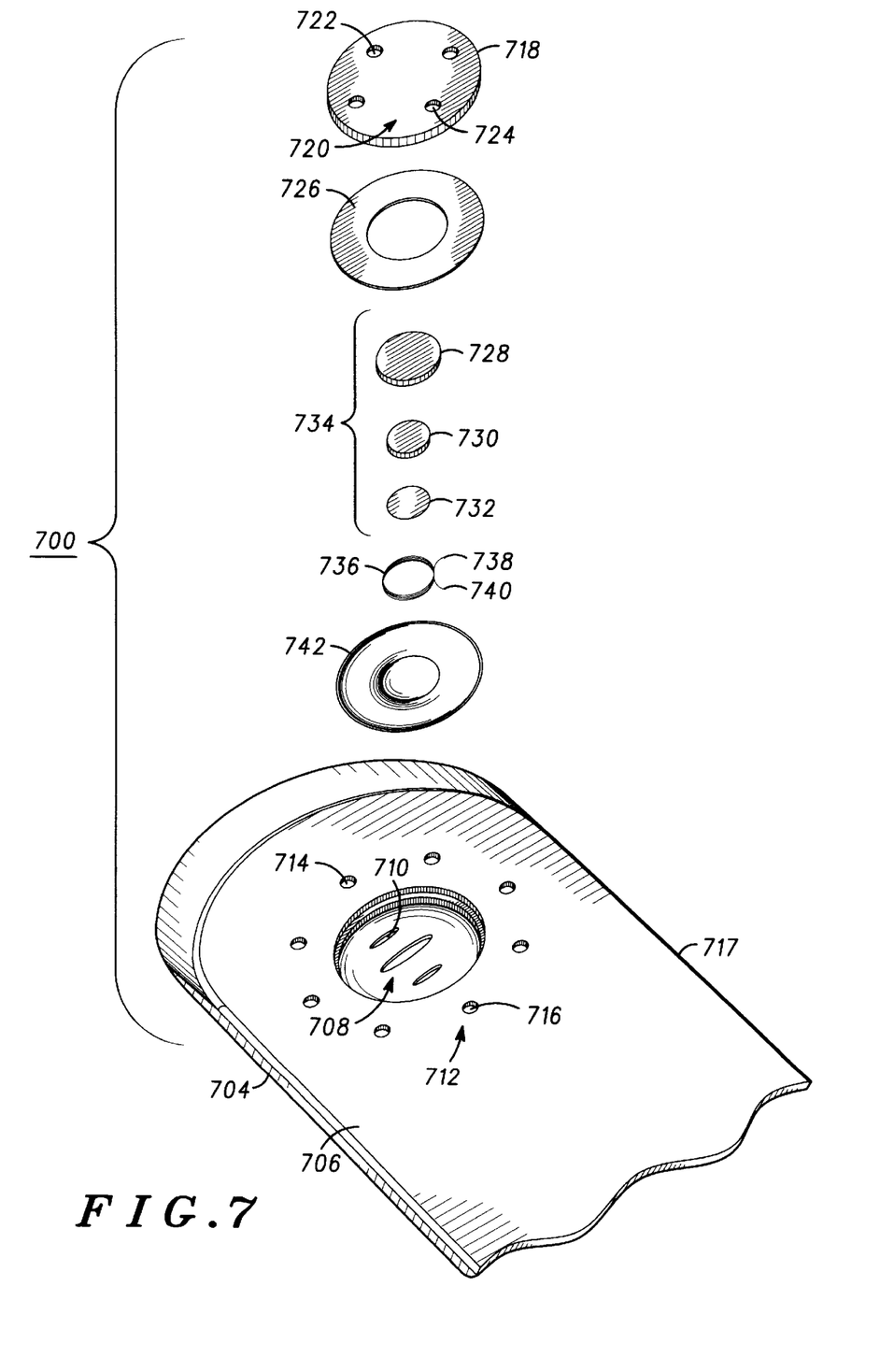
FIG. 7 is an exploded view of a third embodiment of an integrated speaker assembly of a portable radiotelephone.
Figure 8:
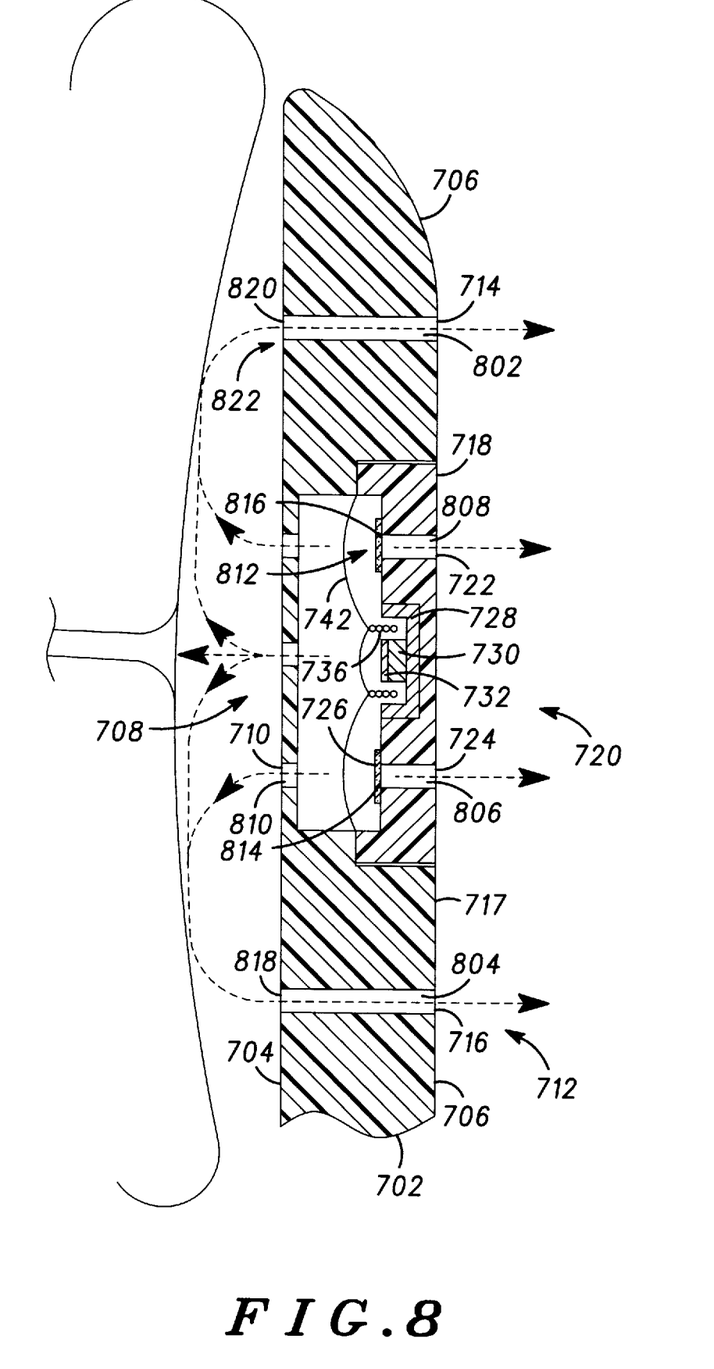
FIG. 8 is a cross section of the third embodiment of FIG. 7.

FIG. 7 shows an exploded view of an integrated speaker assembly 700 of a portable radiotelephone in a third embodiment, and FIG. 8 shows a cross section of integrated speaker assembly 700 attached similarly to that described above in relation to FIGS. 4–6. Integrated speaker assembly 700 includes housing portions 717 and 718, a diaphragm 742, a voice coil 736 having terminals 738 and 740, a polepiece 732, a magnet 730, a yoke 728, and a felt 726. In this embodiment, diaphragm 742 is made of a formed plastic film.

Referring to FIGS. 7 and 8 in combination, housing portion 717 forms a recess on a rear surface 706 opposite a front surface 704 of an upper housing similar to upper housing 102 of FIG. 1. Front surface 704 has an ear placement region (not visible) similar to ear placement region 114 of FIG. 1. A plurality of openings 708, such as an opening 710, are formed through housing portion 717. A plurality of openings 712, such as openings 714 and 716 positioned outside of the ear placement region on rear surface 706, lead to a plurality of openings 822, such as openings 818 and 820 positioned within the ear placement region on front surface 704, through passages formed by housing portion 717 such as passages 802 and 804. A plurality of openings 720, such as openings 722 and 724, formed on housing portion 718, lead to a plurality of openings 812, such as openings 814 and 816, through passages formed by housing portion 718 such as passages 806 and 808. In this embodiment, the passages may be referred to as ports. Constructed and assembled as described, integrated speaker assembly 700 may be referred to as a "rear-loaded" assembly.

Operation of the portable radiotelephone corresponding to FIGS. 7 and 8 is substantially the same as that described in relation to FIGS. 1–2 and 4–5. As shown in FIG. 8, sound pressure waves travel substantially the same as those described in relation to FIG. 5, and similar results as described in relation to FIGS. 11–12 are achieved. It is understood that diaphragm 742 may be adhesively attached to either housing portion 717 or housing portion 718, similar to the embodiments shown and described in relation to FIGS. 5 and 6. Felts, meshes, screens, and other suitable materials may be disposed and used as described in relation to the embodiment of FIGS. 1–2 and 4–5.

Thus, a housing portion has a first surface adapted to form at least part of a front surface of a portable radiotelephone. A speaker diaphragm has an outer edge attached to a second surface opposite (or behind) the first surface. Alternatively, a housing portion has a first surface adapted to form at least part of a rear surface of a portable radiotelephone, where a speaker diaphragm has an outer edge attached to a second surface opposite the first surface.

Also, a portable radiotelephone includes a first housing portion and a second housing portion. The first housing portion is attached with the second housing portion to form at least part of a housing. At least one of a receiver and a transmitter is disposed in the housing. A speaker diaphragm has an outer edge attached to an inside surface of the second housing portion.

With such an integrated speaker assembly, a portable electronic device may have a thinner profile since no additional substantially rigid member (such as basket 314 of FIG. 3) to support a speaker diaphragm (such as diaphragm 304 of FIG. 3) is required. If desired, an acoustic frequency response that is independent of a seal around an ear placement region of the portable electronic device may also be achieved.

It is understood that felts 412 (FIG. 4) and 726 (FIG. 7), for example, may be substituted with screens, meshes, or other suitable materials. These felts, screens, or meshes, or other suitable materials may be used for acoustic tuning purposes, as well as for protecting the speaker diaphragm from dust, dirt, etc. Such materials may be suitably disposed in any passages and/or disposed on inner or outer housing surfaces to cover any openings as well. Also, such materials may be used in conjunction with the number of openings to provide suitable tuning of the frequency response, as such materials provide an acoustic resistance to air flow.

It is understood that openings, such as the plurality of openings 120, provide acoustic frequency response characteristics which would depend on the free air resonance of the integrated speaker assembly. Differences in frequency response would be present in sealed and unsealed conditions, depending on the degree of seal present between the ear placement region and the ear.

It is also understood that, for example, diaphragm 402, voice coil 404, and magnetic motor assembly 411 (FIG. 4) may be replaced by a diaphragm having piezo-electric properties. More specifically, for example, a ceramic wafer may be attached or bonded to a thin, flexible metallic element to form a piezo-electric or "PZT" diaphragm, which may be attached to a housing portion as described above. Housing portion 118 (FIG. 4) would be less necessary using the PZT diaphragm, since it is more durable than a diaphragm made of a formed plastic film.

While particular embodiments of the present invention have been shown and described, modifications may be made. It is therefore intended in the appended claims to cover all such changes and modifications which fall within the true spirit and scope of the invention.

What is claimed is:

1. A portable electronic device including an integrated speaker assembly, said integrated speaker assembly comprising:
   a first housing portion with first and second opposing surfaces, a portion of the first surface defining an ear placement region adapted to form at least a partially sealed air space with a user's ear;
   a speaker diaphragm, the speaker diaphragm attached to an inside surface of the housing between the first and second surfaces of the housing to define a first air space between the portion of the first surface and a front side of the speaker diaphragm and a second air space between a rear side of the speaker diaphragm and the second surface;
   at least one first opening between the portion of the first surface and the first air space, the at least first opening allows sound pressure waves from the front side of the speaker diaphragm to travel to the at least partially sealed air space;
   at least one second opening between the second air space and the second surface, the at least second opening allows sound pressure waves from the rear side of the speaker diaphragm to travel to free air; and
   at least one air passage between the portion of the first surface and the second surface, the at least one air passage acoustically coupling the at least partially sealed air space to open air beyond the second surface of the housing, so as to improve frequency response.

2. The portable electronic device according to claim 1, wherein the integrated speaker assembly includes an outer edge of said speaker diaphragm being attached to said housing separating the first and second air spaces.

3. The portable electronic device according to claim 1, further comprising:
   at least one of a felt, mesh, and a screen positioned to resist air flow through said at least one second opening.

4. The portable electronic device according to claim 1, further comprising:
   at least one of a felt, mesh, and a screen positioned to resist air flow through said at least first passage.

5. The portable electronic device according to claim 1, wherein said speaker diaphragm has piezo-electric properties.

6. The portable electronic device according to claim 1, further comprising:
   a speaker magnet, said speaker magnet disposed adjacent to said speaker diaphragm.

7. The portable electronic device according to claim 6, wherein said speaker magnet is carried on said second surface.

8. The portable electronic device according to claim 6, further comprising:
   a speaker yoke, said speaker yoke disposed adjacent to said speaker diaphragm and having said speaker magnet disposed therein.

9. The portable electronic device according to claim 1, further comprising:
   a speaker coil, said speaker coil attached to said speaker diaphragm.

10. A portable electronic device including an integrated speaker assembly, the integrated speaker assembly comprising:
    a housing with first and second opposing surfaces, a portion of the first surface defining an ear placement region adapted to form at least a partially sealed air space with a user's ear;
    at least one of a receiver and a transmitter disposed in said housing;
    a speaker diaphragm, said speaker diaphragm attached to an inside surface of said housing between the first and second surfaces of the housing to define a first air space between the portion of the first surface and a front side of the speaker diaphragm and a second air space between a rear side of the speaker diaphragm and the second surface;
    at least one first opening between the portion of the first surface and the first air space, the at least first opening allows sound pressure waves from the front side of the speaker diaphragm to travel to the at least partially sealed air space;
    at least one second opening between the second air space and the second surface, the at least second opening allows sound pressure waves from the rear side of the speaker diaphragm to travel to free air; and
    at least one air passage between the portion of the first surface and the second surface, the at least one air passage acoustically coupling the at least partially sealed air space to open air beyond the second surface of the housing so as to improve frequency response.

11. The portable electronic device according to claim 10, wherein an outer edge of said speaker diaphragm is adhesively attached to said inside surface separating the first and second air spaces.

12. The portable electronic device according to claim 10, further comprising:
    an assembly opening, said assembly opening on the second surface of said housing, said speaker assembly being assembled through the assembly opening.

13. The portable electronic device according to claim 10, further comprising:
    an assembly opening positioned within said ear placement region, said speaker assembly being assembled through the assembly opening.

* * * * *